United States Patent [19]

Merrell et al.

[11] Patent Number: 5,034,157
[45] Date of Patent: Jul. 23, 1991

[54] INJECTION MOLDABLE COMPOSITE

[75] Inventors: Kenneth C. Merrell, Brea; Gerald A. Rogers, Frazier Park, both of Calif.

[73] Assignee: ITT Corporation, New York, N.Y.

[21] Appl. No.: 495,238

[22] Filed: Mar. 16, 1990

[51] Int. Cl.[5] .......................... H01B 1/22; H01B 1/12
[52] U.S. Cl. .................................. 252/512; 252/513; 252/518; 524/439; 523/205
[58] Field of Search ................ 252/512, 518, 513; 524/439; 523/205

[56] References Cited

U.S. PATENT DOCUMENTS

| | | | |
|---|---|---|---|
| 3,070,132 | 12/1962 | Sheridan | 138/118 |
| 3,070,871 | 1/1963 | Ryckebosch | 428/592 |
| 3,499,815 | 3/1970 | Hof | 156/431 |
| 3,519,520 | 7/1970 | Newman, Jr. | 156/431 |
| 3,555,170 | 1/1971 | Petzetakis | 174/47 |
| 3,580,983 | 5/1971 | Jackson | 174/47 |
| 3,958,066 | 5/1976 | Imamura et al. | 428/372 |
| 4,327,832 | 5/1982 | DeMatteo | 206/328 |
| 4,330,811 | 5/1982 | Bordner | 361/212 |
| 4,416,924 | 11/1983 | Peterson et al. | 427/388.1 |
| 4,566,990 | 1/1986 | Liu et al. | 524/439 |
| 4,599,383 | 7/1986 | Satoji | 524/496 |
| 4,610,808 | 9/1986 | Kleiner | 252/518 |
| 4,723,350 | 2/1988 | Kobayashi et al. | 29/417 |
| 4,735,828 | 4/1988 | Cogswell et al. | 427/359 |
| 4,770,838 | 9/1988 | Cattanach et al. | 264/510 |
| 4,772,521 | 9/1988 | Kromrey | 428/402 |
| 4,777,204 | 10/1988 | Ikenaga et al. | 524/439 |
| 4,783,349 | 11/1988 | Cogswell et al. | 427/407.3 |
| 4,788,104 | 11/1988 | Adriaensen et al. | 252/512 |
| 4,816,184 | 3/1989 | Fukuda et al. | 252/512 |
| 4,849,469 | 7/1989 | Crosby et al. | 524/439 |
| 4,895,892 | 1/1990 | Satake et al. | 524/520 |

FOREIGN PATENT DOCUMENTS 0102159  3/1984  European Pat. Off.
2129523  5/1984  United Kingdom.

Primary Examiner—Josephine Barr
Assistant Examiner—Bradley A. Swope
Attorney, Agent, or Firm—Menotti J. Lombardi

[57] ABSTRACT

An injection moldable composite comprising an admixture of a polyetherketone such as polyetheretherketone (PEEK) matrix resin, a metal filler such as stainless steel fiber coated with a resin sizing soluble in the matrix resin, and glass fiber. The resulting molded form of the composite being electrically conductive and aluminum galvanic compatible.

27 Claims, 3 Drawing Sheets

INJECTION MOLDABLE COMPOSITE

BACKGROUND OF THE INVENTION

BACKGROUND

This invention relates to injection moldable composites, and more particularly to electrically conductive, aluminum galvanic compatible, polyetheretherketone (PEEK) injecting moldable composites. PEEK resins are polyarylene ether ketones having a repeating unit of the formula:

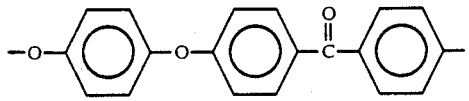

In searching the prior art for PEEK compositions and structures having anti-static characteristics, the following patents were developed:

| Patent Number | Inventor(s) |
| --- | --- |
| 4,416,924 (U.S.) | Peterson et al. |
| 4,772,521 (U.S.) | Kromrey |
| 4,723,350 (U.S.) | Kobayaski et al. |
| 4,599,383 (U.S.) | Satoj |
| 4,735,828 (U.S.) | Cogswell et al. |
| 4,783,349 (U.S.) | Cogswell et al. |
| 2,129,523 (U.K.) | Murray |
| 0,102,159 (E.P.) | Cogswell et al. |
| 4,327,832 (U.S.) | de Matteo |
| 4,330,811 (U.S.) | Bordner |
| 4,770,838 (U.S.) | Cattanach et al. |
| 3,580,983 (U.S.) | Jackson |
| 3,555,170 (U.S.) | Petzetakis |
| 3,963,856 (U.S.) | Carlson et al. |
| 3,958,066 (U.S.) | Imamura et al. |
| 3,070,132 (U.S.) | Sheridan |
| 3,499,815 (U.S.) | Hof |
| 3,519,520 (U.S.) | Newman, Jr. |
| 3,070,871 (U.S.) | Ryckebosch |

As is known from the prior art, injection molded composites similar to PEEK, and including PEEK, are used in many areas and applications including in modern day aircraft. The composites are used to replace metal parts, and in many applications, on a one-to-one basis. The primary reasons for the use of composite materials are lighter weight, less sensitivity to corrosion, and in some cases lower costs. PEEK as a material has been used in many applications in the lay up form. In the injection molded form, however, there have been less applications because of various problems. For example, in the aircraft fuel area where PEEK must come into contact with fuel and aluminum, injection molded parts have not been used to date because the parts have not met aircraft requirements.

One of the past shortcomings of injection molded PEEK material was the incompatibility (galvanic) of PEEK filled with carbon when mounted against aluminum in a fuel system due to unsatisfactory corrosive results. Filling PEEK with glass as opposed to carbon has satisfied the galvanic corrosion problem, but not the conductivity problem, since valves and other components in the fuel area are generally required to dissipate static electricity buildup. Glass filled PEEK is basically an insulator and not a conductor, therefore, it cannot meet the electrical conductivity requirements. The carbon filled PEEK will meet the electrical conductivity requirement, but will not meet the galvanic corrosive requirements. These problems and conditions have been known for at least two years in the aircraft industry and a satisfactory solution had not been forth coming.

An injection moldable composite has been discovered which overcomes the aforementioned difficulties and enables development of a composite injection molded body which may be used in the fuel system, and can be mounted directly to aluminum. The body produced from the material will meet both the galvanic corrosion compatibility electrical conductivity required by the aircraft industry.

BRIEF SUMMARY OF THE INVENTION

It is an object of the invention to provide an injection moldable composite which overcomes the problems and deficiencies of the prior art.

Another object of the invention is to provide an electrically conductive, aluminum galvanic compatible, PEEK injection moldable composite.

A further object of the invention is to provide a body that is electrically conductive, aluminum galvanic compatible, and injection moldable from a PEEK composite.

A still further object of the invention is to provide a method of producing a body that is electrically conductive, aluminum galvanic compatible, and injection moldable from a PEEK composite.

According to the broader aspects of the invention, an injection moldable composite has a polyetherketone base resin, an amount of stainless steel with a sizing and an amount of glass fiber.

A feature of the invention is that a body injection molded from a PEEK composite is electrically conductive, and aluminum galvanic compatible.

BRIEF DESCRIPTION OF THE DRAWINGS

Other objects, features and advantages will become more fully apparent from the following detailed description of the preferred embodiments, the appended claims and the accompanying drawings in which:

DESCRIPTION OF THE PREFERRED EMBODIMENTS

The invention is able to provide an electrically conductive aluminum galvanic compatib injection moldable, polyetherketone composite by adding to a glass fiber-filled polyetherketone matrix resin metal fiber filler in an amount effective to provide conductivity. The metal does not galvanically react with aluminum surfaces. Conductive metal fiber is required, and stainless steel fibers are preferred.

Initial attempts to form injection moldable matrix resins containing glass fibers and stainless steel fibers were not satisfactory since the stainless steel fibers tended to flock and agglomerate. It was discovered in accordance with the invention that using stainless steel fibers sized with a resin compatible with the matrix resin resulted in ready and uniform dispersion of the fibers throughout the polyetherketone matrix resin. The sizing of resin is preferably wettable by the matrix resin and can be soluble therein. The amount of sizing resin can vary, from approximately 5 percent by weight to 15 percent by weight based on the total weight of the sized fiber. A soluble sizing resin will dissolve in and become part of the polyetherketone matrix resin. The preferred matrix resin is a polyetheretherketone (PEEK) resin.

Figure 1:
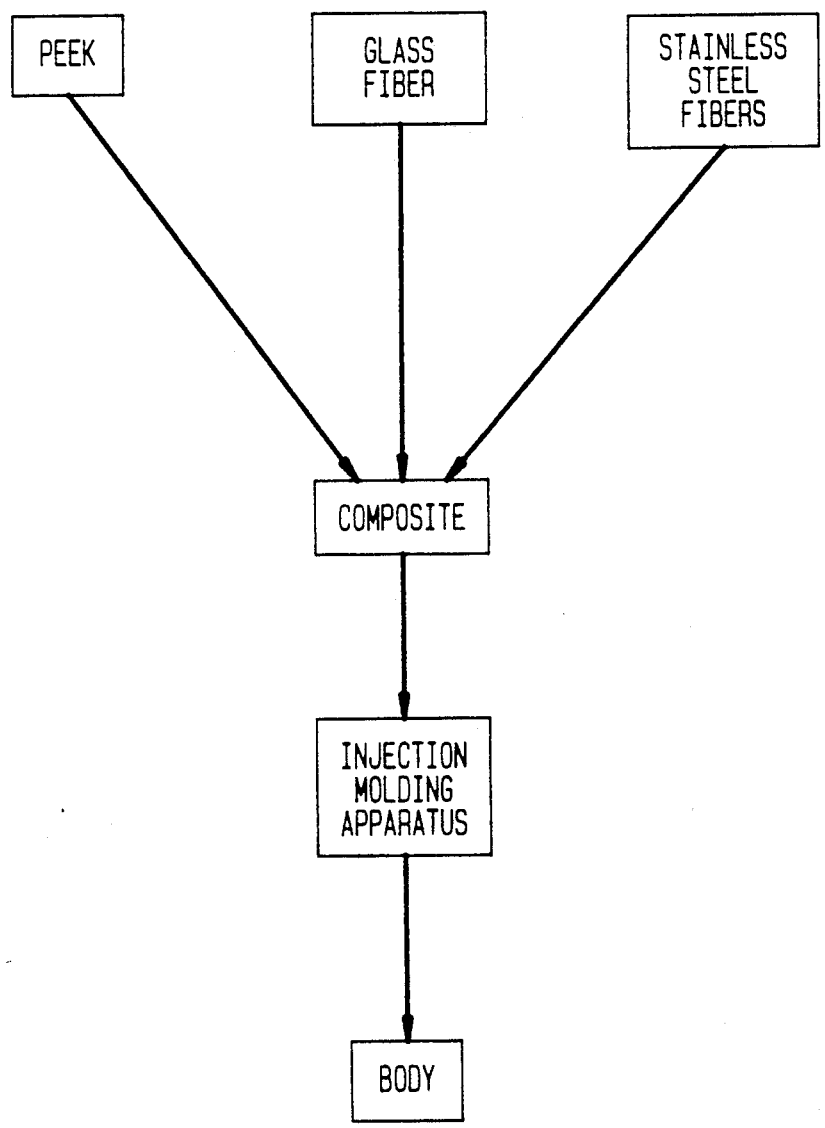
FIG. 1 is a block diagram illustrating a method of compounding a PEEK composite and forming a body using the composite.
Figure 2A:
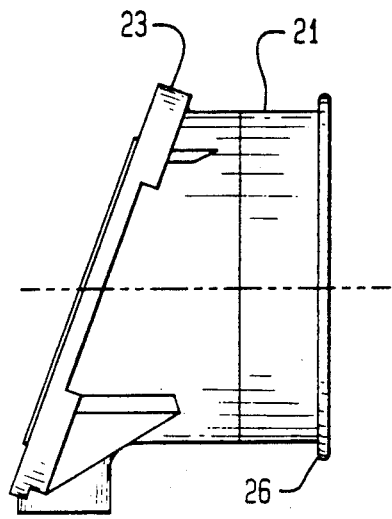
FIGS. 2A-2D illustrate a typical valve body injection molded from the composite.
Figure 2B:
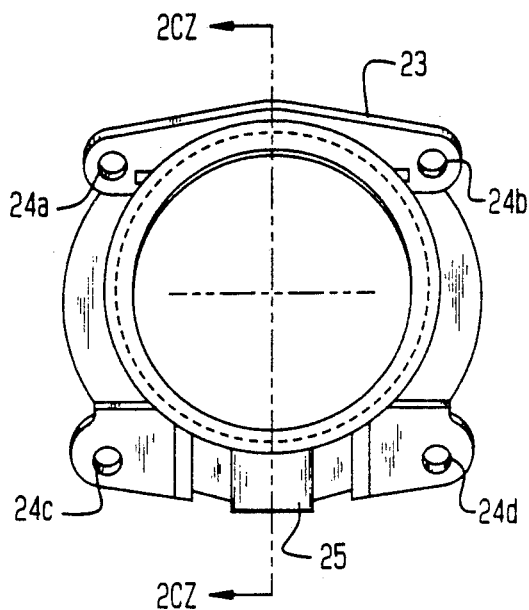
Figure 2C:
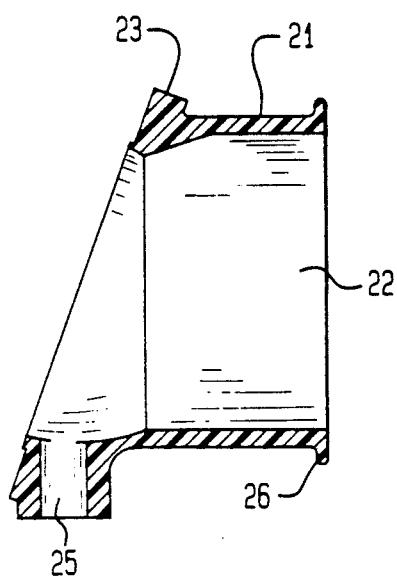
Figure 2D:
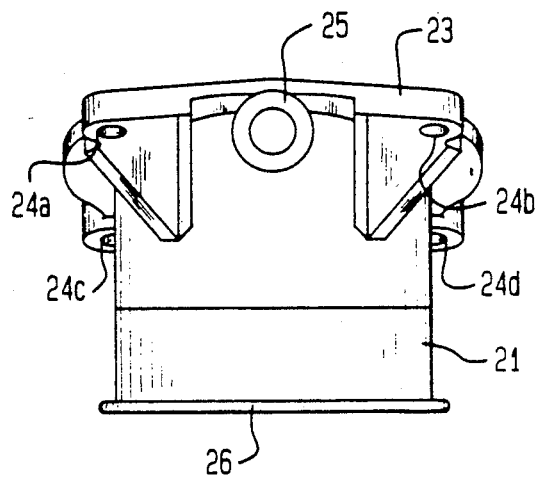

Referring to FIG. 1, a composite was prepared using a base PEEK resin and adding stainless steel fibers (type 302) with sizing of polysulfone material (a PEEK sizing is also suitable) and selective amounts of glass fibers, the composite having the following mixture and proportions:

| | APPROXIMATE PERCENT BY WEIGHT | |
|---|---|---|
| | PREFERRED | RANGE |
| Stainless Steel Fibers[1] | 8 | 6-10 |
| Glass Fibers | 30 | 10-40 |
| PEEK | 62 | 84-50 |

[1]With Polysulfone sizing being present in the amount of approximately 10% by weight of the total weight of the sized fiber.

The composite may be compounded by the injection molder prior to placing the composite in the hopper of the injection molding apparatus which may be, for example, an Engle 225 Ton Injection Molding Machine (Ludwig Engel Canada, Ltd., Guelph, Ontario, Canada). It will of course be understood that the type and size of the injection molding apparatus will depend on the size and type of body to be injection molded using the composite. For a valve type body having a central body size in the order of 1.5 inches in length and 2 inches in diameter as shown, for example, in FIGS. 2A-2D, the Engle 225 Ton Injection Molding Machine would operate at a temperature of about 735° F. and a pressure of about 9830 psi for about 1.5 minutes per cycle. Such a valve body would typically include a central body portion 21, a channel 22 therethrough, and a mounting flange 23. The flange 23 would include mounting holes 24-d for connecting to the aluminum structure in a known manner. The flange 23 would also include a port 25 and smaller flange portion 26 for coupling to the other portion of the valve.

The composite could also be obtained from compounders that supply such mixtures, according to a molders requirements. One such compounder is RTP Co. (Winona, Minn.).

PEEK with predetermined amounts of glass fiber is available from ICI Advanced Materials Group (Wilmington, Delaware). The steel fibers in the preferred embodiments are Bekaert (Marietta, Ga.) 302 stainless steel fibers sized with polysulfon material, such fibers had an approximate diameter of 8 microsn (may vary 2-22 microns) and length of 4 mm (may vary from 2-10 mm). Any 300 series stainless steel fiber or equivalent would be acceptable. The sizing amount is acceptable in the range of approximately 5 percent by weight to 15 percent by weight based on the total weight of the sized stainless steel fiber.

It was discovered that it is important that the stainless steel fibers be sized with either the PEEK material or a polysulfone material to prevent flocking of the stainless steel fiber and that it be dispersed evenly throughout the PEEK and glass fiber mixture. The sizing, being compatible with the PEEK, is absorbed during the molding operation.

Standard test bars were produced to determine physical properties of the composite comprising an approximately percent by weight of these materials: 30% glass fiber, 6%-8%-10% stainless steel fibers sized with polysulfone material, and balance PEEK.

Average physical properties from a number of test bars were as follows:

| PROPERTY | ASTM METHOD | UNITS | TEST BARS | | |
|---|---|---|---|---|---|
| SIZED Stainless Steel - % by Wt. | | | 6 | 8 | 10 |
| SPECIFIC GRAVITY (Calc) | D792 | | 1.67 | 1.65 | 1.65 |
| TENSILE STRENGTH, Ultimate | D638 | PSI | 18850 ±1000 | 18980 ±1000 | 19470 ±1000 |
| TENSILE ELONGATION, Ultimate | D638 | % | 1.54 ±0.26 | 1.87 ±.26 | 1.69 ±.26 |
| FLEXURAL STRENGTH | D790 | PSI | 32380 ±1000 | 30790 ±1000 | 32000 ±1000 |
| FLEXURAL MODULUS | D790 PSI | $10^5$ | 15.57 ±0.64 | 16.02 ±0.64 | 15.86 ±.64 |
| IMPACT-NOTCHED ¼" | D256 | FT. LBS/IN | 2.0 | 1.7 | 1.8 |
| IMPACT-UNNOTCHED ¼" | D256 | FT. LBS/IN | 12 | 11 | 11.5 |
| SURFACE RESISTIVITY | D257 | OHM | $9 \times 10^3$ | $5 \times 10^3$ | 300 |
| VOLUME RESISTIVITY | D267 | OHM-CM | $3 \times 10^6$ | $2 \times 10^5$ | $8 \times 10^4$ |

When the preferred composite was injection molded to form a prototype valve body as shown, for example, in FIGS. 2A-2D, the body was tested for galvanic corrosion and electrical conductivity and satisfied the requirements of having an effective voltage differential potential of less than 0.25 volts when measured with aluminum, meeting a 500-hour accelerated corrosion test per MIL-STD-810, and having a $1 \times 10^6$ ohms per square centimeters maximum surface resistivity.

The foregoing described an invention for a composite having selected amounts of sized stainless steel fibers and glass fibers, in a polyetheretherketone matrix resin to provide the desired amount of electrical conductivity, and electrical galvanic balance between the injection molded body, fuel, and aluminum. The resultant body satisfies the needs for aircraft applications. This inventive combination is not limited to valve bodies, but can be utilized for structural members, mechanical devices, pressure enclosures, etc., which are utilized in aircraft, especially in any areas where contact with fuel will occur.

Figure 3A:
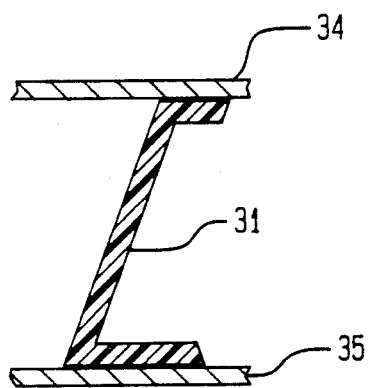
FIGS. 3A-3C illustrate examples of other type bodies which may be injection molded using the composite.
Figure 3B:
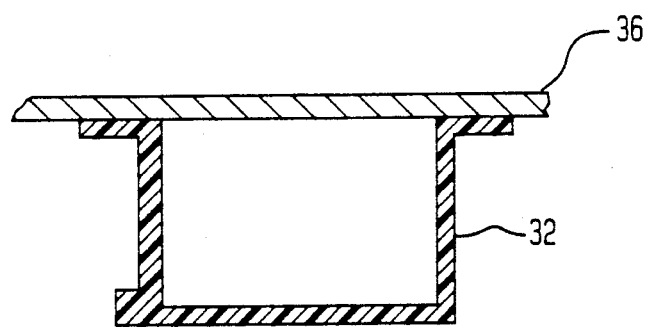
Figure 3C:
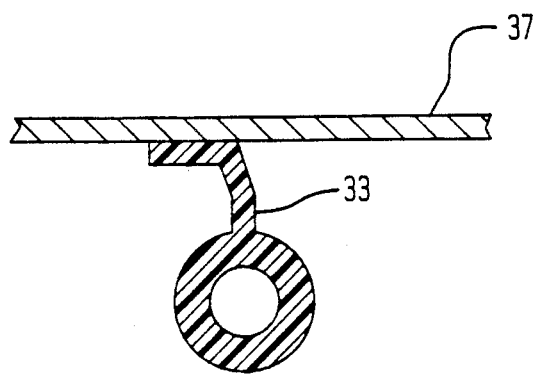

As shown in FIGS. 3A-3C variously shaped bodies 31, 32, 33 may be connected, respectively to aluminum members 34, 35, 36, 37. Body 33, for example, may carry fuel.

Although a primary application for this invention would be in aircraft structures and or components utilized throughout the aircraft, especially in the area of the fuel system, other applications in the automotive and shipping industry are readily apparent. The application would be where lightweight, galvanic balance, and electrical conductivity are important. This invention permits wide application for the composite by injection molders of various molded parts, with the largest potential application being aircraft structural parts. It is anticipated that many commercial and military applications will be developed once it is known that the inventive composite provides a satisfactory solution to concerns of corrosion and conductivity without sacrificing other desirable physical properties for the particular application.

While the present invention has been disclosed in connection with the preferred embodiments thereof, it should be understood that there may be other embodiments which fall within the spirit and scope of the invention as defined by the following claims.

What is claimed is:

1. An injection moldable, electrically conductive, aluminum galvanic compatible composite comprising:
    approximatley 50 to 84 percent by weight of polyetherketone resins;
    approximately 10 to 40 percent by weight of a dispersion of glass fibers; and
    approximately 6 to 10 percent by weight of a dispersion of individual stainless steel fibers coated with a sizing soluble in and wettable by said resin.

2. The composite according to claim 1 wherein said sizing is a polyetherketone resin sizing or a polysulfone resin sizing.

3. The composite according to claim 1 wherein said stainless steel fibers are 302 stainless steel fibers.

4. An injection moldable composite comprising:
    a polyetherketone thermoplastic molding base resin containing a dispersion of a mixture in an amount to form in percent by weight of the composite, approximately 30 percent by weight of glass fiber and 6 to 10 percent by weight of individual, stainless steel fiber coated with a sizing soluble in and wettable by said resin.

5. The composite of cliam 4 wherein said sizing is a PEEK resin or a polysulfone resin.

6. The composite of claim 5 wherein said sizing is present in an amount equal to approximately 5 to 15 percent by weight based on the total weight of the sized stainless steel fiber.

7. An injection moldable composite for forming a valve body that is electrically conductive and aluminum galvanic compatible, the composite forming the valve body comprising:
    approximatley 50 to 84 percent by weight of polyetherketone resin;
    approximately 10 to 40 percent of glass fibers; and
    approximately 6 to 10 percent by weight of individual stainless steel fibers coated with a sizing thereon that is soluble in and wettable by said resin.

8. The composite according to claim 7 wherein said sizing is a polyetherketone resin sizing or a polysulfone resin sizing.

9. The composite according to claim 8 wherein said stainless steel fibers are 302 stainless steel fibers.

10. A valve body injection molded from a composite comprising:
    a polyetherketone thermoplastic molding base resin; and
    a mixture in an amount to form in percent by weight of the composite, approximately 30 percent by weight of glass fiber and 6 to 10 percent by weight of polyetherketone resins sized, individual stainless steel fiber, said sizing being soluble in and wettable by said base resin.

11. A mixture for an injection molded body that is electrically conductive, aluminum galvanic compatible, the mixture comprising:
    approximatley 50 to 84 percent by weight of polyetherketone thermoplastic molding resin;
    approximately 10 to 40 percent by weight glass fibers; and
    approximately 6 to 10 percent by weight resin sized, individual, stainless steel fibers, said sizing resin being soluble in and wettable by said molding resin.

12. The mixture according to claim 11 wherein said stainless steel fibers are 300 type stainless steel fibers with sizing in an amount of 8 to 12 percent by weight based on the total weight of the sized stainless steel fibers.

13. An injection molded body being formed from a composite comprising:
    a polyetherketone thermoplastic molding base resin; and
    a mixture in an amount to form in percent by weight of the composite, approximately 30 percent by weight of glass fiber and 6 to 10 percent by weight of individual, sized stainless steel fiber coated with a sizing soluble in and wettable by said molding resin.

14. The composite of cliam 13 wherein said sizing is PEEK resin sizing or a polysulfone resin sizing.

15. The composite of cliam 14 wherein said stainless steel fiber is a 300 series stainless steel fiber.

16. An injection molded valve body, electrically conductive aluminum galvanic compatible, molded from a composite consisting of:
    a polyetherketone thermoplastic molding base resin; and
    a mixture of approximately 30 percent by weight of glass fiber and 8 percent by weight of resin sized, individual, stainless steel fibers coated with a resin sizing soluble in and wettable by said molding resin.

17. An injection molding composition comprising in combination, an admixture of:
    approximatley 62 percent by weight of polyetherketone thermoplastic molding resin;
    approximately 30 percent by weight of glass fibers; and
    approximately 8 percent by weight of individual, stainles steel fibers sized with resin soluble in and wettable by said molding resin.

18. A resin composition for forming an injection moldable, electrically conductive, aluminum glavanic-compatible composite comprising:
    approximately 50 to 84 percent by weight of PEEK matrix resin;
    approximately 10 to 40 percent by weight of glass reinforcement fibers dispersed therein; and
    approximately 6 to 10 percent by weight of sized, individual metal fibers dispered in said resin in an amount providing electrical conductivity, said sizing being soluble in and wettable by said matrix resin.

19. A resin composition according to claim 17 in which the sized metal fibers are coated with a sizing resin capable of dispersing the metal fibers in the matrix resin.

20. A filled resin composition according to claim 19 in which the sizing is soluble in the matrix resin.

21. A filled resin composition according to claim 20 which the sizing resin is selected from polyetherketone or polysulfone.

22. A filled resin composition according to claim 21 in which the sizing resin is present on the metal fibers in an amount of from 5 percent by weight to 15 percent by weight based on the total weight.

23. A filled resin composition according to claim 22 in which the metal fiber is stainless steel.

24. A filled resin composition according to claim 23 in which the polyetherketone is present in the composition in an amount from at least 50 to 84 percent by weight.

25. A filled resin composition according to claim 24 in which the glass fibers are present in the composition in an amount from 10 to 40 percent by weight.

26. The composite according to claim 1 in which the resin is a polyarylene ether ketone resin.

27. The composite according to claim 26 in which the resin has a repeating unit of the formula:

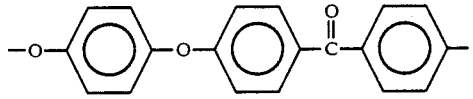

* * * * *